Dec. 1, 1953    W. STONE, JR    2,660,732
MOVABLE POST-ENUCLEATED IMPLANT
Filed Sept. 29, 1949    2 Sheets-Sheet 1
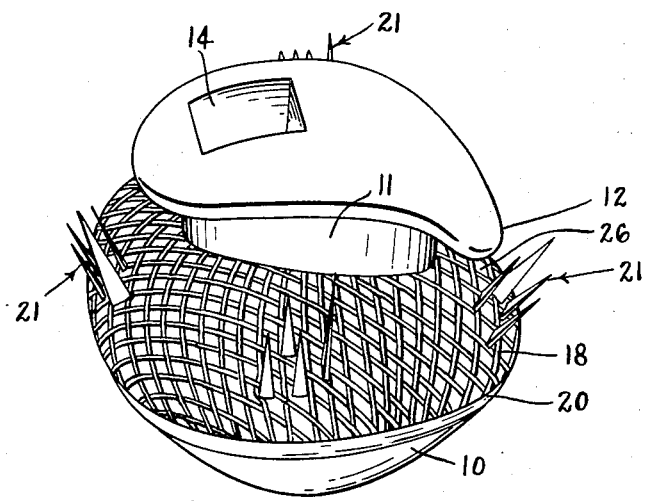
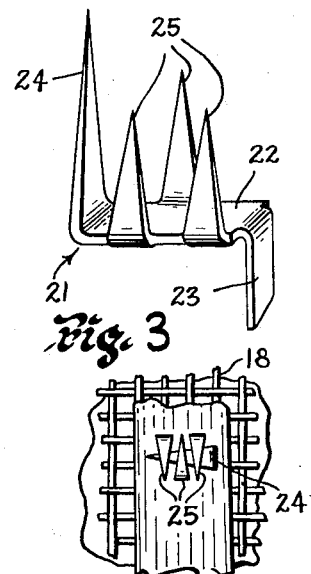
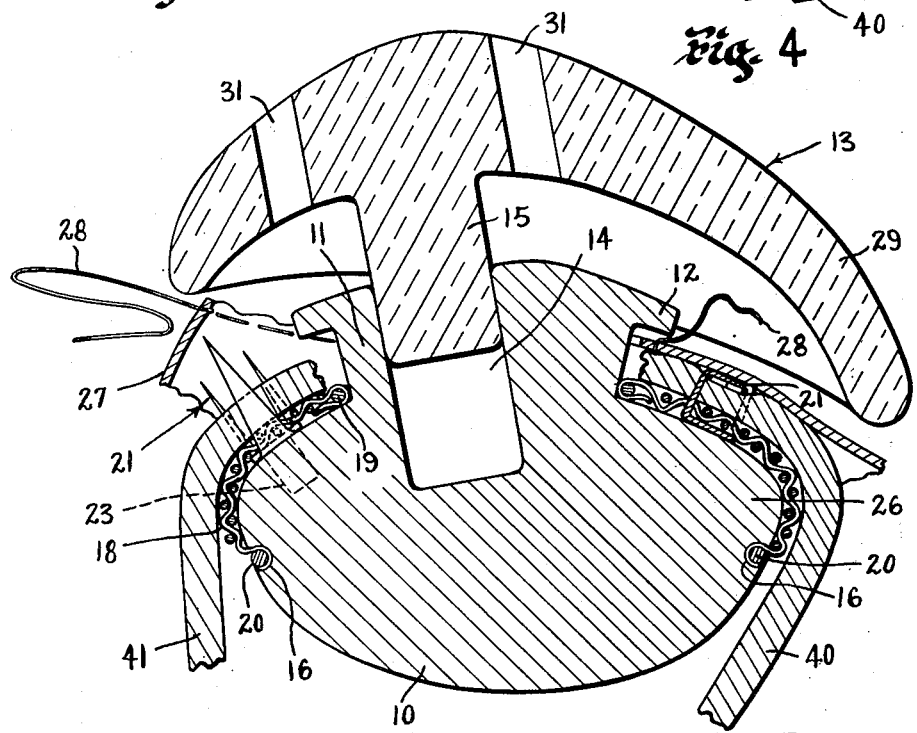
INVENTOR
WILLIAM STONE, Jr.
BY
ATTORNEY Dec. 1, 1953 W. STONE, JR 2,660,732
MOVABLE POST-ENUCLEATED IMPLANT
Filed Sept. 29, 1949 2 Sheets-Sheet 2

INVENTOR
WILLIAM STONE, Jr.
BY
*J. H. McCready*
ATTORNEY.

Patented Dec. 1, 1953

2,660,732

UNITED STATES PATENT OFFICE 2,660,732

MOVABLE POST-ENUCLEATED IMPLANT

William Stone, Jr., Cambridge, Mass.

Application September 29, 1949, Serial No. 118,610

9 Claims. (Cl. 3—13)

This invention relates to improvements in artificial eyes of the type known as "implants" which are used as replacements for human eyes when the latter have been enucleated. The invention involves both a novel implant structure and also a new method of making and using such structures either immediately after the enucleation of a human eye or upon reopening the socket of an eye which has been previously removed.

While this art has long been practiced, little progress has been made until very recently in replacing a human eye with an artificial eye so attached to the muscles of the enucleated eye that they could move it in a manner closely simulating the movements of a natural eye. The absence of such movement has been one of the serious objections to artificial eyes. In recent years some progress has been made toward the solution of this problem but the operative procedure resulting from these developments has required a degree of skill possessed only by very few surgeons, and the operations themselves have been extremely time-consuming and tedious affairs.

The method which has met with most success has involved the attachment of the implant to the eye muscles by a very fine tantalum thread or wire of an extremely delicate nature and very liable to become broken. Due to the fact that two hours or more is required for such an operation, there is also the danger, always present, of over-taxing the patient with the consequent possibility of extremely unfortunate effects.

Another major difficulty in an operation of this type is that of correctly securing the muscles to the implant with that control of length of muscle necessary to ensure the movement of the artificial eye in a manner so closely resembling that of a normal eye as to avoid attracting attention. If the operation requires the replacement of one eye only, then it is of the utmost importance from the standpoint of satisfying the patient, that the artificial eye shall move exactly in synchronism with, and shall have substantially the same amplitude of movement, as the normal eye.

Also, in artificial eye replacements as heretofore made, even by highly skilled surgeons, there has been some dissatisfaction from both the standpoint of the surgeon and the patient because of the exposure of the edges of portions of the artificial eye which are not intended to be visible.

A further difficulty with prior art methods of replacing a human eye with an implant, even by the best methods heretofore available, is that the operating procedure is so difficult and requires such a high degree of skill, that it is impossible for the great majority of individuals requiring an operation of this type to be accommodated.

The present invention is especially concerned with the problems presented by the objectionable features of the prior art implants and methods, and it aims to devise a thoroughly satisfactory solution for these problems. In particular, an important object of this invention is to devise methods and means of replacing human eyes with implants which will so simplify the procedure that the number of surgeons skilled in operating technique of this nature will be greatly increased and the needs of the public will be satisfied to a correspondingly greater degree, and also to ensure that there will be no need for re-operation or complete failure as the result of detaching of muscle.

Further objects of the invention are to provide, as hereinafter set forth, an artificial eye which is simple in its construction and arrangement, durable, thoroughly efficient in its use, readily assembled, natural appearing, light in weight, mobile and non-irritating, as well as impervious to changes in temperature and to socket secretions, resistant to breakage, and comparatively economical to manufacture.

The invention will be readily understood from the following description when read in connection with the accompanying drawings, in which:

Fig. 1 is a perspective view of an implant made in accordance with this invention;

Fig. 2 is a horizontal section taken approximately through the center of the implant and illustrating particularly the means for attaching the implant in the socket of an enucleated eye and further showing the related conformer;

Fig. 3 is a perspective view of a clip used for securing the muscles to the implant;

Fig. 4 is a fragmentary front elevational view illustrating the method of attaching a muscle to the implant;

Figure 5:
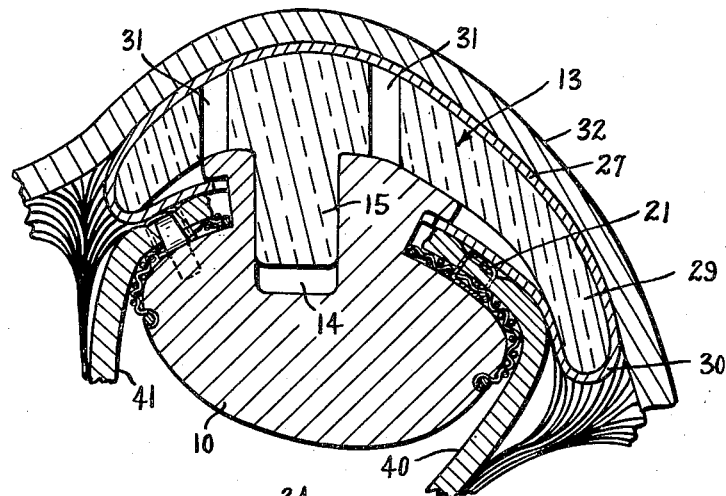
Fig. 5 is a horizontal sectional view showing the conformer in final assembled relation with an implant during the healing period.

Referring more particularly to the drawings wherein like characters of reference designate like parts throughout the several views, an artificial eye or implant embodying the present invention comprises broadly a main ball portion 10, somewhat elongated in shape, and molded or otherwise formed to the size and contour desired. Preferably it is made of a translucent plastic material, such as methyl methacrylate, having white or other desired color pigments added thereto. This ball member 10 may be produced by methods well known in the manufacture of artificial eyes.

Extending forwardly from the frontal surface of the ball portion 10 is a neck 11 terminating in a somewhat oval or elongated head 12, the axis of which is generally parallel to that of the ball portion. This head has a curved plate-like shape including a peripheral flange which is spaced from the ball portion 10 by a groove or channel surrounding the neck. Also, one end of the head 12 is curved downwardly and is inclined laterally and rearwardly, as best shown in Fig. 2.

Cooperating with the parts just described, when the eye is assembled, is a conformer 13 which is connected to the ball section 10 by providing the latter with a socket or opening 14 to receive a projection 15 extending rearwardly from the posterior surface of the conformer.

It has been found advantageous in anchoring the muscles and tissues to the ball portion of an artificial eye to use a foraminous or mesh-like metal structure, usually fabricated from tantalum wire, and a section of this wire mesh is used for this purpose in the present construction. This material is shown at 18. One edge of the mesh is bound with a wire 19 which closely encircles the neck 11 and its opposite edge is secured to the ball by reinforcing it with a wire 20 and providing the ball with a groove 16 to receive this reinforced margin. Preferably the groove is made of such dimensions that when the wire 20 is forced into it, it will draw the exposed surface of the mesh tightly into conforming relation with the ball portion 10 and anchor this edge, at the same time cooperating with the circumferentially extending wire 19 to hold the entire section of mesh firmly to the ball 10.

As above indicated, one of the very troublesome problems in properly positioning an implant in an eye socket has been to attach the muscles to it in such a manner that they can move the artificial eye in ways closely approximating the motion of a normal eye. An important feature of this invention, therefore, resides in a novel arrangement for securing the ends of the muscles to the ball 10. For this purpose four clips 21, preferably made of tantalum or some other suitable material are provided, each having a substantially flat base portion 22, Fig. 3, adapted to be positioned upon the surface of the ball 10 beneath the mesh 18. Each clip has a downwardly extending lug or tongue which is embedded in the material of the ball portion 10 and it also is provided with an opposed, upwardly extending, pointed end portion or spur 24, slightly longer than similarly shaped spurs or projections 25 extending upwardly from opposite sides of the base 22. These spurs 24 and 25 protrude through the mesh 18, as clearly shown in Figs. 1 and 2.

The clips are so located on the ball portion 10 that when the implant is properly positioned in the eye socket, the spurs will be located at the required points of attachment of the four major rectus muscles, the superior, inferior, lateral and medial.

The spurs 24 and 25 are adapted to pierce the muscles and can be subsequently bent into overlying relation therewith, preferably by first bending the long spur 24 inwardly and then bending the shorter spurs 25 inwardly also where they overlie the long spurs 24, as shown in Fig. 4. The spurs 25 are initially spaced so that they will interfit when so bent over.

With this attaching means the time consumed in securing the muscles to the implant is greatly reduced as compared to slow, tedious and painstaking prior art methods of suturing. Moreover, this operation can be performed with far greater ease and assurance of ultimate success. In particular, it facilitates the step of achieving the desired length control of the muscles so that the artificial eye will subsequently be moved by the muscles in a manner closely simulating that of a normal eye.

It is also evident, with such a construction, that the eye muscles will, during the healing process, grow into and adhere to the mesh 18 adjacent the clips 21 while the surrounding tissues, such as tenons and conjunctiva, will also become permanently attached or adhered to it. The tantalum clip will secure the muscle sufficiently firmly and for a completely sufficient length of time to allow for firm growth of muscular and connective tissue into the mesh work for a sufficiently long period of time so that the muscles will not become detached with the ensuing possibility of extrusion of the entire implant. This latter possibility was very prevalent with the prior art.

As a further aid in producing the desired muscular action and control, the ball portion 10 of the implant is provided with a lateral bulge 26, Fig. 2, in the area over which the lateral rectus muscle 40 extends when secured to the ball by the clip 21.

Since it is known that the lateral rectus muscle is normally weaker than the medial rectus muscle 41, it will be understood that after the lateral rectus muscle has been attached to the ball portion 10 in overlying relation to the bulge portion 26, this bulge will act as a fulcrum and hence increases the ability of the lateral rectus muscle to move the implant more efficiently than has heretofore been possible.

The method employed in removing the eye of an individual and of replacing said eye with an implant embodying the present invention is broadly substantially as follows:

A cut is formed through the conjunctiva about the contour of the cornea of the eye to be removed. The conjunctiva illustrated diagrammatically at 27, Fig. 2, is then rolled backwardly of the sclera to expose the rectus muscles. Each of the muscles is securely gripped by suitable clamp means and is severed from the eye to be removed and retained in proper isolated position until the eyeball is removed from the socket. A suitable ball portion 10 is then inserted in the socket and each of the muscles is attached by a clip 21 to said ball portion, as described above. The tenons tissue is properly located and the conjunctiva is then drawn into place by a pursestring suture 28, or the like, in surrounding relation with the neck portion 11 and into the space or channel provided between the flange 12 and the upper surface of the ball portion 10. Thus, during the healing operation, the conjunctiva 27 will be prevented from growing over the anterior surface of the implant. This method of suturing the conjunctiva avoids the foremost complication encountered previously, namely, exposure of mesh work which might result from improper suturing of the conjunctiva, as heretofore practiced.

At this time a conformer 13 is attached to the ball portion 10 by inserting the tongue or projection 15 in the opening 14 provided therefor in the neck 11. The conformer 13 is shaped to the general contour of the anterior or visible portion of a human eye and is made slightly oversize and with an outward and rearwardly extending lateral portion 29, Fig. 5, which substantially fills the fornix 30 formed by the conjunctiva 27 and is adapted to retain the shape of the fornix during healing (see Fig. 5). The conformer 13 is also provided with one or more openings 31 to permit the passage of discharges from the eye socket, if necessary.

After the conformer 13 has been positioned over the ball portion 10 in this manner, the eyelids 32 are closed or drawn into overlying relation therewith, substantially as shown in Fig. 5, and the eye is allowed to heal. The wider neck does not necessitate drawing the conjunctiva as far centrally as it is placed on the human eye, thus producing more conjunctival tissue laterally and providing a wider and deeper conjunctival sac. This produces more space for the lateral rotation of the implant and the attached conformer and overcomes the previous disturbing showing of the lateral edge of the anterior shell when the patient looks in a medialway direction, namely, toward the nose.

As the eye tissues heal, the conjunctiva 27 will assume a relatively taut intimate overlying relation to the ball portion 10 of the implant and the muscles and surrounding tissues will become securely interlaced with the mesh 18. After the eye has healed sufficiently, the conformer 13 is removed. This causes a deep fornix to remain and permits a wider range of movement without danger of exposing the lateral edge of the main eye portion during said movement. Later the conformer is replaced by the main eye portion 33, Fig. 6, of the implant which is of substantially the same contour and shape as the conformer but is of somewhat smaller dimensions. Also, it is made to resemble, as closely as possible, the visible portion of the enucleated eye. The main eye portion 33 includes an iris portion 34, a scleral portion 35 and a transparent anterior covering 36, all formed of a plastic material, and is provided with a tongue or extension 37 on its rear surface to fit within the hole 14 in the ball portion 10 formerly occupied by the projection 15 of the conformer.

The main eye portion 33 is removable so that it may be cleansed, altered, or replaced, if desired.

Figure 6:
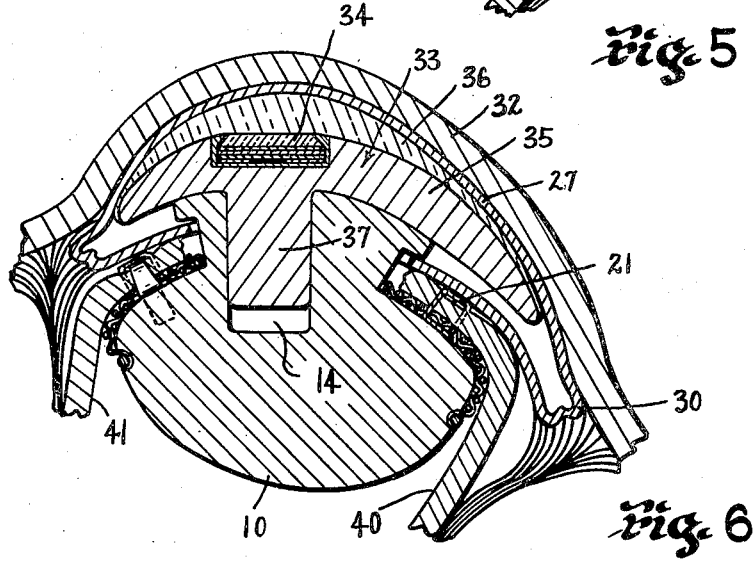
Fig. 6 is a sectional view similar to Fig. 5 showing the final visible artificial eye portion in place of the conformer.

The scleral section 35, Fig. 6, of the main eye portion 33 is molded in a manner similar to the ball portion 10 and is so colored as to resemble the sclera of the normal eye. Also, the iris portion 34 may be formed in the main eye portion 33 in any suitable or known manner, such as by providing a recess in the scleral section 35 and disposing the colored iris portion 34 therein. After being assembled the eye is provided with a transparent coating 36 formed during the heat-fusing of the various parts together and the resultant eye will be essentially of a plastic composition, having a clear, transparent coating overlying the iris and sclera and curved substantially to the contour of the cornea of the normal eye.

Figure 7:
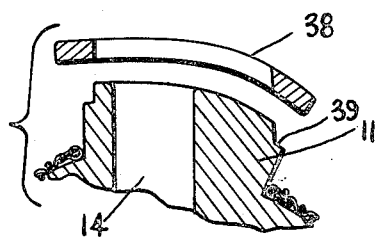
Fig. 7 is a fragmentary sectional view of the anterior projecting portion of the implant showing a modification thereof.

Although applicant has referred to a specific form of neck portion 11 and head or flange 12 for preventing the conjunctiva 27 from growing over the anterior surface of the ball portion 10, it is to be understood that the flange 12 may be in the form of a ring member 38, as shown in Fig. 7, which is adapted to fit around the upper reduced end portion of the neck and upon a shelf 39 formed circumferentially of the neck portion 11. It can be removed when the conformer 13 is replaced by the main eye portion 33.

The ball portion 10 of the implant tapers or curves rearwardly to provide the clearance necessary to give it free universal movement in the socket so that it can respond more easily to the full range of movement imparted by the motive muscles. The ball portion 10 with the attached mesh 18 functions to fill in the cavity formed by removing the human eye and serves to retain the tissues of the socket in place and to cause the front or main eye portion 33 of the implant to assume a position corresponding to that of the normal eye in its socket; that is, it prevents the sclera or cornea of the artificial eye from appearing sunken or from protruding outwardly too far with respect to the related position of the normal eye.

It is also to be understood that although the foregoing description refers specifically to an implant of the two-piece type having a ball portion and a separate main eye portion, a one-piece eye could conceivably be provided with the clips 21 for attachment of the muscles and with the mesh 18 to which the tissues will grow. Also, a one-piece eye could easily be provided with the enlarged bulge over which the lateral rectus muscle is extended in the same manner as in the two-piece construction.

From the foregoing description and a study of the drawings, it will be seen that the simple and efficient means and methods here shown and described accomplish all of the objects of the invention. With it, the time involved in the replacement of an enucleated eye with an implant of the nature here set forth is reduced from a period of over two hours to about twenty minutes. Also, the possibility of extrusion, or breaking loose, of the implant from the muscles and the socket, which is so prevalent in the prior art, is obviated. Moreover, the technique involved is so simplified that a surgeon experienced in eye work can learn the operative procedure required in a very short time. And the operation can be performed with an assurance of satisfactory results, both to the surgeon and the patient, which has not been possible with any prior art method or means of which applicant has been able to learn. The simplicity and speed of this procedure, both from the standpoint of the surgeon and the patient, will make this art possible for the great numbers of patients who have eyes enucleated every year, rather than the very few who might be, or have been, benefited by the prior art.

These are extremely important practical advantages which have definitely been found in actual practice to attend the use of this invention.

It will be evident, however, that many changes may be made in the methods described and in the construction and arrangement of the parts shown without departing from the spirit or scope of the invention, and that the description and drawings are to be interpreted as illustrative and instructive, rather than limiting.

Having thus described my invention, what I desire to claim as new is:

1. An implant for use in replacement of an eye of an individual, said implant comprising an implant portion shaped for insertion within the eye socket, and pointed connection means fixedly carried by said implant portion and having integral attachment portions for piercing the motive muscular structure of the eye being replaced and for attaching said structure to said implant.

2. An artificial eye for replacement of an eye of an individual comprising an implant shaped for insertion within the eye socket and connection means in the form of pointed projecting members carried by said implant for piercing the motive muscular structure of the eye being replaced and being bendable to grip said muscular structure thereby to attach it to said implant.

3. An artificial eye for replacement of an eye of an individual comprising an implant shaped for insertion within the eye socket and connection means of the nature of a clip carried by said implant and having a plurality of pointed projections thereon extending outwardly of said implant for piercing the motive muscular structure of the eye being replaced and attaching said structure to said implant.

4. An artificial eye for replacement of an eye of an individual comprising an implant shaped for insertion within the eye socket and connection means of the nature of a clip carried by said implant, said clip having a portion fixedly secured to said implant and further having a plurality of pointed spurs bendable to grip the motive muscular structure of the eye being replaced thereby to attach said structure to said implant.

5. An artificial eye for replacement of an eye of an individual comprising an implant shaped for insertion within the eye socket and connection means comprising a clip having a base portion seated adjacent the surface of said implant, a portion extending from said base portion into the material of said implant for fixedly securing the clip to said implant, and a plurality of projections extending outwardly of said base portion to which the motive muscular structure of the eye being replaced by said artificial eye may be attached, said projections being so located and constructed as to pierce the muscle being attached and to be bent into overlying relation with said muscle and into interfitting relation with each other.

6. An artificial eye for replacement of an eye of an individual comprising an implant portion shaped for insertion within the eye socket and a main eye portion, connection means carried by said implant portion to which the motive muscular structure of the eye being replaced may be attached, said implant portion being non-globular in cross section due to its having a laterally extending bulge adjacent the joint of attachment of the lateral rectus muscle, said bulge acting as a fulcrum for increasing the efficiency of said muscle.

7. An artificial eye for replacement of an eye of an individual comprising a main ball portion shaped for insertion within the eye socket and a main eye portion, connection means carried by said main ball portion and having projecting portions to which the superior, inferior, lateral and medial rectus muscles of the eye being replaced may be attached, said connection means being so positioned that the said muscles when attached are in overlying relation with portions of said main ball portion, said main ball portion being non-globular in cross section due to its having a laterally extending bulge in the area over which the lateral rectus muscle extends, said bulge acting as a fulcrum for increasing the efficiency of said muscle.

8. An artificial eye for replacing an eye of an individual comprising an implant portion having foraminous material overlying the forward portion thereof and clip means having a base portion on said implant portion and pointed prong portions extending through said foraminous material.

9. An artificial eye for replacement of an eye of an individual comprising a ball portion shaped for insertion within the eye socket, a conformer detachably secured to said ball portion, a neck portion extending outwardly from the anterior surface of the ball portion, said neck portion terminating in a flange-like head the margin of which projects beyond the neck, said neck having an elongated portion extending laterally toward the area over which the lateral rectus muscle is located when secured to said ball portion, whereby said elongated portion cooperates with a lateral projection of the conformer to form a large lateral pocket or fornix to accommodate the lateral projection of the main eye portion after healing has taken place.

WILLIAM STONE, JR.

References Cited in the file of this patent

UNITED STATES PATENTS

| Number | Name | Date |
|---|---|---|
| 2,516,804 | Rolf et al. | July 25, 1950 |

OTHER REFERENCES

American Journal Ophthalmology, August 1946, volume 29, #8. "Plastic Eye Implant," by A. D. Ruedeman, pp. 947–951. A copy is in Division 55 of the U. S. Patent Office.

American Journal Ophthalmology, February 1949, volume 32, #2. "A Universal Type Integrated Implant," by N. L. Cutler, p. 253. A copy is in Division 55 of the U. S. Patent Office.

"A Positive Contact Ball and Ring Implant for Use After Enucleation," published in volume 37 of Archives of Ophthalmology, January 1947, pp. 73–79.